US010606600B2

(12) United States Patent
Hrusecky

(10) Patent No.: US 10,606,600 B2
(45) Date of Patent: Mar. 31, 2020

(54) FETCHED DATA IN AN ULTRA-SHORT PIPED LOAD STORE UNIT

(71) Applicant: International Business Machines Corporation, Armonk, NY (US)

(72) Inventor: David A. Hrusecky, Cedar Park, TX (US)

(73) Assignee: International Business Machines Corporation, Armonk, NY (US)

(*) Notice: Subject to any disclaimer, the term of this patent is extended or adjusted under 35 U.S.C. 154(b) by 364 days.

(21) Appl. No.: 15/173,078

(22) Filed: Jun. 3, 2016

(65) Prior Publication Data

US 2017/0351521 A1 Dec. 7, 2017

(51) Int. Cl.
*G06F 9/38* (2018.01)
*G06F 9/30* (2018.01)

(52) U.S. Cl.
CPC .......... *G06F 9/3814* (2013.01); *G06F 9/3016* (2013.01); *G06F 9/30043* (2013.01); *G06F 9/3824* (2013.01); *G06F 9/3832* (2013.01); *G06F 9/3836* (2013.01); *G06F 2212/452* (2013.01)

(58) Field of Classification Search
CPC .................................................... G06F 9/3802
See application file for complete search history.

(56) References Cited

U.S. PATENT DOCUMENTS

| 5,353,426 A | 10/1994 | Patel et al. |
| 5,418,922 A * | 5/1995 | Liu ............ G06F 12/0864 711/128 |
| 5,809,522 A | 9/1998 | Novak et al. |
| 5,897,651 A * | 4/1999 | Cheong ......... G06F 12/0864 711/122 |
| 6,269,427 B1 | 7/2001 | Kuttanna et al. |
| 7,685,410 B2 | 3/2010 | Shen et al. |
| 2002/0138700 A1 * | 9/2002 | Holmberg ........ G06F 9/3802 711/137 |

(Continued)

OTHER PUBLICATIONS

Roth, Amir, "Store Vulnerability Window (SVW): Re-Execution Filtering for Enhanced Load/Store Optimization," Technical Reports (CIS), Paper 35, University of Pennsylvania Scholarly Commons, Jan. 2004.

(Continued)

*Primary Examiner* — William B Partridge
(74) *Attorney, Agent, or Firm* — Patterson + Sheridan, LLP

(57) ABSTRACT

Techniques are disclosed for receiving an instruction for processing data that includes a plurality of sectors. A method includes decoding the instruction to determine which of the plurality of sectors are needed to process the instruction and fetching at least one of the plurality of sectors from memory. The method includes determining whether each sector that is needed to process the instruction has been fetched. If all sectors needed to process the instruction have been fetched, the method includes transmitting a sector valid signal and processing the instruction. If all sectors needed to process the instruction have not been fetched, the method includes blocking a data valid signal from being transmitted, fetching an additional one or more of the plurality of sectors until all sectors needed to process the instruction have been fetched, transmitting a sector valid signal, and reissuing and processing the instruction using the fetched sectors.

20 Claims, 4 Drawing Sheets

(56) References Cited

U.S. PATENT DOCUMENTS

| | | | | |
|---|---|---|---|---|
| 2004/0044847 A1* | 3/2004 | Ray | ............... | G06F 12/0859 |
| | | | | 711/122 |
| 2008/0172548 A1* | 7/2008 | Caprioli | ............ | G06F 9/30181 |
| | | | | 712/216 |
| 2009/0282225 A1* | 11/2009 | Caprioli | ............... | G06F 9/3826 |
| | | | | 712/225 |
| 2010/0262781 A1* | 10/2010 | Hrusecky | ............ | G06F 9/30043 |
| | | | | 711/119 |
| 2010/0268886 A1* | 10/2010 | Frey | ............... | G06F 12/0811 |
| | | | | 711/122 |
| 2014/0189243 A1* | 7/2014 | Cuesta | ............... | G06F 12/0864 |
| | | | | 711/128 |
| 2015/0199272 A1 | 7/2015 | Goel et al. | | |

OTHER PUBLICATIONS

Bobba et al., "Safe and Efficient Supervised Memory Systems," 2011 IEEE 17th International Symposium on High Performance Computer Architecture (HPCA), IEEE, 2011.

\* cited by examiner

FETCHED DATA IN AN ULTRA-SHORT PIPED LOAD STORE UNIT

BACKGROUND

The present disclosure generally relates to computer systems, and more specifically, to fetching data from memory for processing instructions.

Computer processing cores fetch data from memory to be used for processing instructions. Once the data is fetched, the data is often stored in a register, such as a general purpose register (GPR), so that instructions can be performed with the data. The fetch process is often designed to be as fast as possible in three respects. First, the delivery of the data to the GPR should be fast. Second, the delivery of a valid indication that the fetch has found the intended data from memory and delivered it should be fast. This indication is often referred to as a data_valid indication. Third, the delivery of a concluding signal ("finish") that a load/store unit (LSU) is done processing the fetch in all respects should be fast. This finish signal indicates that the address was good, the translation was good, no error occurred, etc., with respect to the fetch.

Many processing systems attempt to make the second aspect, the data_valid response time, as short as possible. When the data_valid arrives back at an issue sequencing unit (ISU), it is known that any younger instructions that are dependent on the result of this load (using the data as an operand) can now issue. There are distinct advantages to this, especially that the shorter the data_valid indication, the less time spent for dependent instruction to wait in the ISU queues. A more empty ISU queue means a smaller footprint, the ability to hold new to-be-issued instructions, and faster timing due a smaller footprint.

However, going too fast, or the sending the data_valid back too early, may skip over condition checks that are important to block data_valid, and were previously able to be contained in a design with a later data_valid. One such condition is called a "partial hit."

Fetching data into a cache is typically broken up into fetching subsections of an entire cacheline in a cache one at a time. These subsections are known as sectors. A partial hit is the condition where a fetch has reached the point of bringing back at least one data sector for a fetch, and now another load has launched that wants to use one of the data sectors that has not arrived yet. This scenario can result in a reject for the load looking for the missing sector because the data_valid has not yet been delivered.

In some instances, the second load may encounter a situation where a data_valid has been sent, but the data for the second load is not good (i.e., the correct sector has not arrived yet). The only recourse the processing system can take is to flush out the dependent operations that have consumed this errant data, because these operations were issued but received incorrect data. Flushes are very disruptive to the smooth flow of a program.

SUMMARY

One embodiment presented herein discloses a method for controlling the use of fetched data that is sent in multiple sectors in an ultra-short piped load store unit. The method generally includes receiving an instruction for processing data, wherein the data comprises a plurality of sectors. The method includes decoding the instruction to determine which of the plurality of sectors are needed to process the instruction and fetching at least one of the plurality of sectors from memory. The method includes determining whether each sector that is needed to process the instruction has been fetched. If all sectors needed to process the instruction have been fetched, the method includes transmitting a sector valid signal and processing the instruction. If all sectors needed to process the instruction have not been fetched, the method includes blocking a data valid signal from being transmitted, fetching an additional one or more of the plurality of sectors until all sectors needed to process the instruction have been fetched, transmitting a sector valid signal, and reissuing the instruction and processing the instruction using the fetched sectors.

Other embodiments include, without limitation, a computer program product that includes a non-transitory storage medium having computer-readable program code that enables a processing unit to implement one or more aspects of the disclosed methods as well as a system having a processor, memory, and application programs configured to implement one or more aspects of the disclosed methods.

BRIEF DESCRIPTION OF THE SEVERAL VIEWS OF THE DRAWINGS

So that the manner in which the above-recited features of the present disclosure can be understood in detail, a more particular description of the disclosure, briefly summarized above, may be had by reference to the embodiments, some of which are illustrated in the appended drawings. It is to be noted, however, that the appended drawings illustrate only exemplary embodiments and are therefore not to be considered limiting of its scope, and may admit to other equally effective embodiments.

DETAILED DESCRIPTION

Embodiments presented herein disclose techniques for an ultra-short pipeline that can speed up the return of data_valid signals while eliminating the potential hazards of a partial hit that could cause a flush of dependent instructions. Sector valid bits are tracked with a table that is interrogated to determine when the data for an instruction has been retrieved from memory. A data_valid signal is blocked until all sectors needed by the instruction have been retrieved from memory and the data for the instruction is ready to process.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

Figure 1:
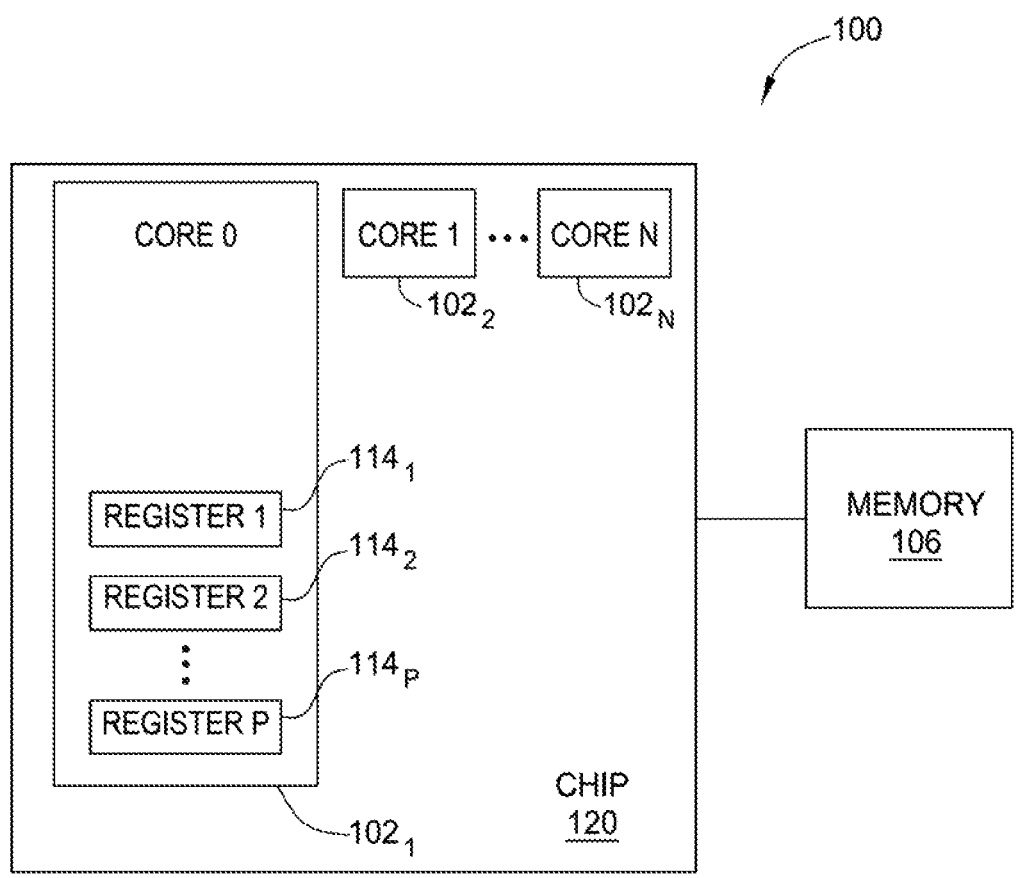
FIG. 1 illustrates an example multi-core processor, according to one embodiment.

FIG. 1 illustrates a computer system 100 according to one embodiment for managing fetched data in an ultra-short piped load store unit. The computer system 100 includes a chip 120 that includes one or more processor cores 102, shown as Core 1, Core 2, . . . , Core N. Embodiments described herein may utilize any number N of processor cores. In other embodiments, components of system 100 shown as on chip 120 may be located off the chip, and components of system 100 shown as off chip 120 may be located on the chip.

Computer system 100 also comprises memory 106. Memory 106 may comprise a random access memory (RAM), a read-only memory (ROM), an erasable programmable read-only memory (EPROM or Flash memory), an optical storage device, a magnetic storage device, or any suitable combination of the foregoing. Memory 106 is operable to store data that may be retrieved for processor operations.

Computer system 100 also comprises registers 114. Embodiments described herein may utilize any number P of registers 114, and each register 114 may be any length. Registers 114 store bits of information that can be read out or written. Registers 114 may be vector registers, general purpose registers, special purpose registers, or any other suitable register type. Registers 114 are illustrated only within Core 0 in this figure for simplicity, although the other cores may also include any number of registers.

Figure 2:
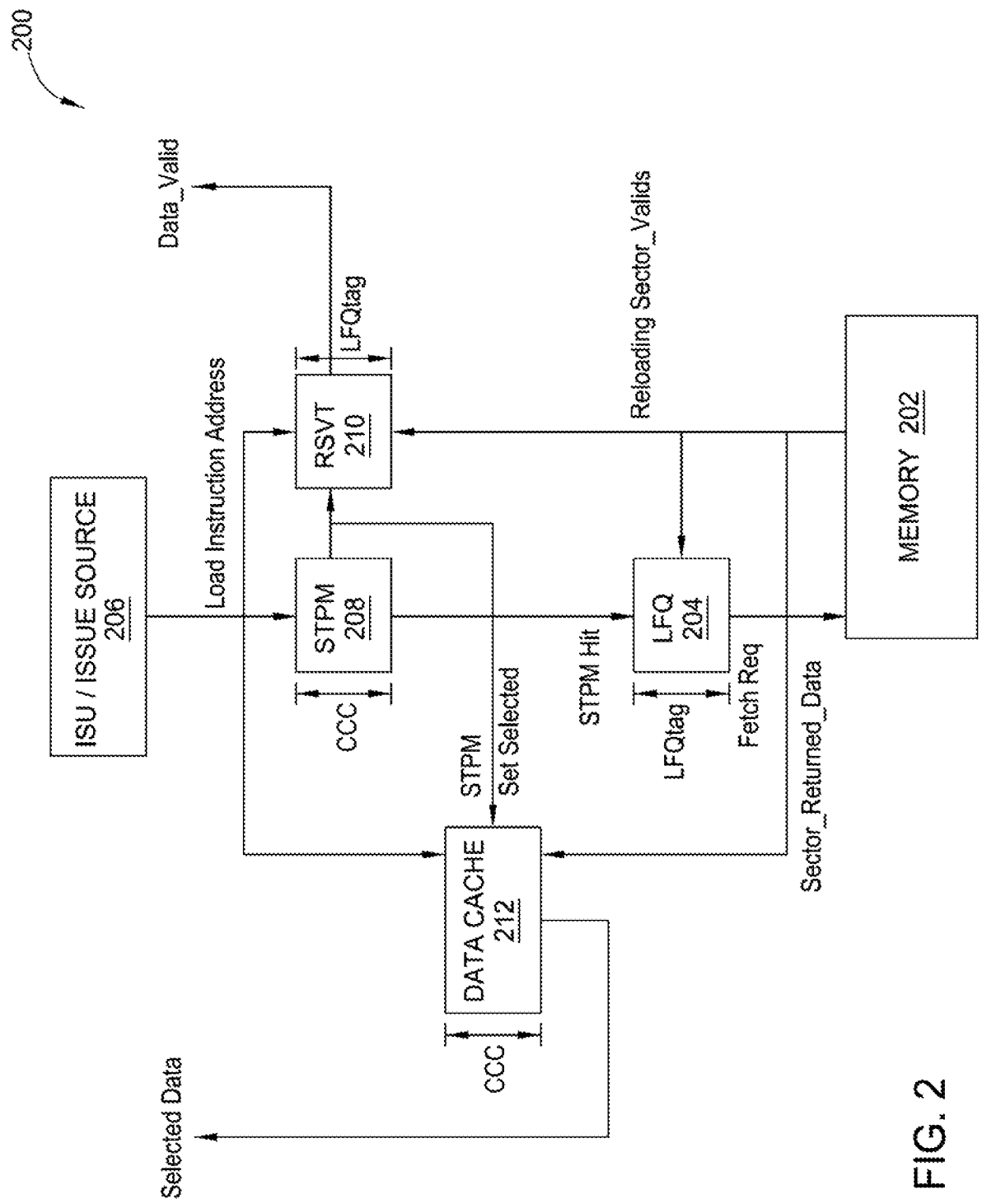
FIG. 2 illustrates a portion of an example processing pipeline according to an embodiment.

FIG. 2 illustrates a portion of an example processing pipeline 200 according to an embodiment. A full processing pipeline includes many other components that are not illustrated here for simplicity. Pipeline 200 includes a memory 202. Memory 202 may comprise any suitable type of memory. Memory 202 illustrated here is a component that may also represent memory within a processing core and/or memory outside of a processing core. Memory 202 is operable to transmit data (Sector_Returned_Data) to data cache 212 and sector valids (Reloading Sector_Valids) to RSVT 210.

Data cache 212 is also illustrated. Most modern caching systems store cachelines in a grid-like structure consisting of a certain number of rows and a certain number of ways/sets (associativity). As an example, a 64 rows by 8 sets by 128 byte cacheline equals a 64K L1 cache. An address is looked up in a directory or set predicting mechanism to identify which set should be accessed for any particular load access. The address involved in this directory lookup is a subset of the full address, called a cache congruence class (CCC) address.

Pipeline 200 further comprises a load fetch queue (LFQ) 204, an issue sequencing unit (ISU) 206, a set prediction mechanism (STPM) 208, and a reload sector-valid table (RSVT) 210. The LFQ 204 fetches data from the memory 202 via fetch requests. The ISU 206 receives and dispatches instructions to the execution units (not shown), and transmits load instruction addresses to STPM 208. ISU 206 may also comprise queues that store instructions. STPM 208 predicts a location of requested data within a cache memory system (STPM Set Selected). Selected Data is released from data cache 212 to one or more GPRs. The selected data may be sent to a multiplexer/formatter to arrange the bytes in proper order to satisfy the demands of the load instruction.

RSVT 210 comprises a small table that resides at the front of the cache addressing logic that runs in parallel with the cache directory/set predicting access. RSVT 210 is described in further detail below in FIG. 3. When an instruction enters the ISU 206, the instruction has an associated address. The address is flowed through the RSVT 210 to determine whether cache lines are in transition from memory 202 to LFQ 204 and whether sector valid bits should be sent to ISU 206.

Historically, a cache directory holds the address of the cache lines that come in from the memory hierarchy. For example, an L1 cache holds a subset of the hierarchical memory that is larger than the L1 cache. Therefore a directory denotes what data is in the L1 cache. This directory also had sector valid bits. When a cache line is fetched from a higher-level memory, the cache line is usually larger than the bussing structure that transports the data. A cache line could be 64 bytes, 128 bytes, 256 bytes, etc. That number of bytes is larger than the bussing system that transports the data. Thus, when the data is moved it has to be transported in 2 or 4 "shots" (sectors) on the bussing system. Each shot takes a separate cycle of transfer time. In addition, some shots arrive earlier than others. These shots are placed in the cache as they arrive. When the later shots are many cycles away, an efficient processing system is able to use the arrived portion without waiting on the remaining portions.

In some processing systems, each sector is marked with a valid bit as it arrives, called the sector valid or sector valid bit. There is also a master valid bit that encompasses the entire cache line. If an L1 cache system has a capacity of 256 or more cache lines, there could be four sector valid bits per cache line plus some form of parity protection, because bits are often stored in a register file with parity protection. Thus, the system could employ eight sector valid bits per cache line depending on the pipeline structure. Because there may be a large number of sectors, storing and managing the sector valid bits can require a large amount of space. If these are stored in STPM 208, this causes a large increase in the size of STPM 208, which slows down STPM 208, and somewhat spoils the reason to have such a set predicting mechanism. RSVT 210 addresses this storage issue.

Sector valid bits are in a state of flux when a cache line first begins to reload into an L1 memory space. When a fetch is performed, nothing is yet in the L1 directory. When the first sector of data arrives, information about the data also arrives with it, such as the real address, and information that informs the system which of the several sectors being retrieved has been retrieved. As the sectors arrive, sector valid bits are populated into the directory one at a time. When a transaction is complete and all sectors have arrived, all sectors will stay valid for the lifetime of that cache line as it resides in the L1 cache. Until this cacheline ages out, the sector valid bits remain. Therefore the sector valid bits are used for a short amount of time compared to the hopefully long life of the cache line in the L1 cache.

Thus, sector valid bits only need to be tracked for cache lines that are in flux. Once a steady state is reached, the sector valid bits do not need to be tracked anymore. RSVT 210 achieves this goal.

Data fetched from cache is fetched with LFQ 204, also sometimes knows as a Load Miss Queue (LMQ). LFQ 204 has a number of queue positions (ordered by LFQtag) that it uses as the control mechanisms to fetch hierarchical data. LFQ 204 can have 4, 8, or 16 positions or state machines in some embodiments. LFQ 204 receives an address and then it fetches data from that address with a fetch request. The state machine or position in LFQ 204 remembers the address while the fetch is outstanding. LFQ 204 also counts the sector valids as they arrive. When the last sector valid is received and everything looks good (no errors, etc.), LFQ 204 can shut down that particular queue fetching mechanism and take on another job. An LFQ 204 can thus have 4, 8, or 16 outstanding fetches in parallel in some embodiments, depending on the number of queue positions.

In the example embodiment herein, LFQ 204 has eight fetching mechanisms, so eight outstanding fetches can occur at one time. Thus, there are only eight possible cache lines out of 256 that can have sector valid bits in flux. RSVT 210 holds information about those eight cache lines that are in flux (ordered by LFQtag). All others are assumed to be either at steady state or the cacheline itself is invalid. If the cacheline is invalid, that information is kept in the directory itself by a master valid bit that will be off. If the master valid bit is on, and there is no indication in the sector valid table that that particular cacheline is in flux, then it is assumed that all the sector valid bits have arrived and there is no need to interrogate the sector valid bits anymore.

LFQ 204 operates under two principles. First, LFQ 204 does not allow a second fetch to occur to the same cacheline in memory while a first fetch is operating. Second, LFQ 204 does not allow a second fetch to land in the same L1 cache location while a first fetch is still in operation.

Figure 3:
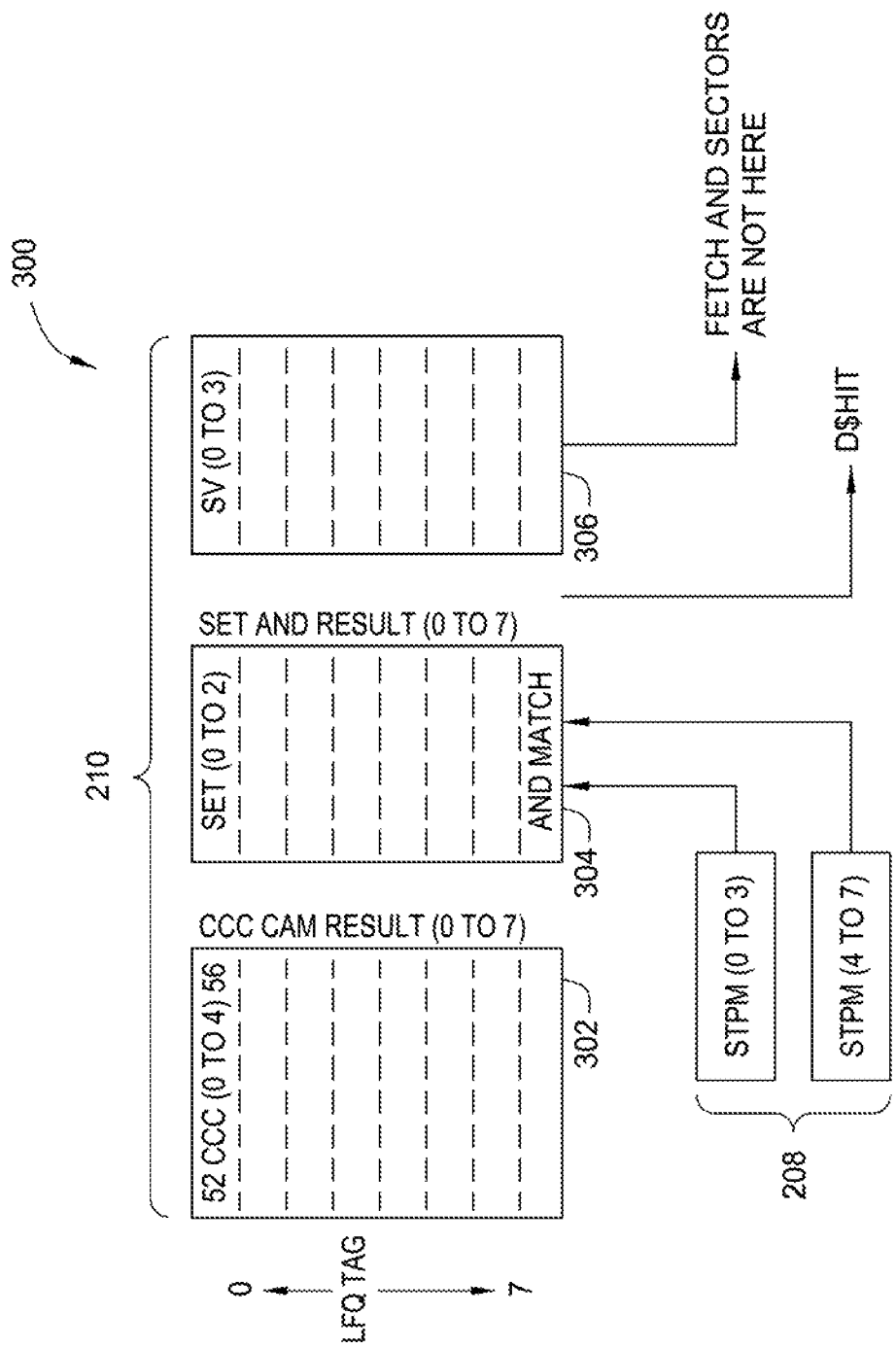
FIG. 3 illustrates an example reload sector valid table according to an embodiment.

FIG. 3 illustrates an example diagram of RSVT 210 and the various flows that interact with RSVT 210. The RSVT 210 runs in parallel with the cache directory/set predicting access. The contents of RSVT 210 are arranged in LFQ 204 entry order. RSVT 210 contains, for each entry, the CCC address of the fetching load, the set to be written to, and the current state of the sectors of returned data (i.e., which sectors have already arrived). While the much larger directory/set predicting accesses are occurring, the relatively small RSVT 210 will CAM (content addressable memory) the CCC section for a possible hit.

RSVT 210 is interrogated upon a load coming through the ISU 206 instruction delivery system. An instruction is delivered to ISU 206, and each instruction has an address. That address is "flowed" through RSVT 210 to determine sector valids.

First, section 302 of RSVT 210 holds effective address bits 52-56 as shown. As mentioned above, cache memory is stored in a gridlike structure, with an x-y dimension. The Y dimension is the cacheline congruence class (CCC). The CCC is the address bit associated with looking up the cache. The CCC can be obtained directly from the effective address. In one embodiment, bits 57-63 (not shown) describe bytes within the cache line. Bits 52-56 (the CCC) denote the specific cacheline out of a particular page table in memory. The CCC is stored in RSVT 210 in section 302. The x-dimension of the cache is the associativity. Typically, a cache has two or four sets. In this example, the cache uses eight sets. Set (0 to 2) 304 illustrates three bits, and those three bits denote the eight sets. Therefore, this example illustrates 32×8 cachelines, or 256 cachelines.

The next section of RSVT 210 are the sector valid bits, 306, denoted as SV(0 to 3). Sector valid bits enter RSVT 210 off of a reload bus mechanism from the higher level memory structure 202 (see Reloading Sector_valids in FIG. 2). The sector valid bits are entered into the table as they arrive for each cacheline based on the LFQ tags. As noted above, the LFQ 204 employs eight possible fetching mechanisms in this embodiment. In sum, the first and second sections (302 and 304) together describe the x and y position of data in the cache being fetched by LFQ 204. The third section (306) holds the particular sector valid bits that are associated with that particular fetch.

As cache lines are being reloaded, RSVT 210 is in a state of flux. Some fetches are completed, while others are in progress. As a load operation is received, the load includes an address set of bits 52-56. With those bits, a CAM (cascade address memory) operation is performed (i.e., match the addresses of instructions with the addresses in the first section 302 by searching through the entire set of eight congruence class addresses and matching them all). If any of the addresses match, a 1 is indicated for that particular row. Then, the flow starts to flow to the right and goes next to the set section 304. STPM 208 looks up an address and predicts which cache line will be hit (set prediction).

RSVT 210 is a relatively small and fast table that can reside next to the STPM 208. STPM 208 predicts a value that will be a vectorized hit that says one of these eight sets is the set for the access when the system accesses the L1 cache to retrieve data (see STPM Set Selected and STPM Hit in FIG. 2).

STPM 208 predicts a set value (STPM Set Selected) that flows to a data cache to release the data and also flows into RSVT 210. Eight bits flow through this section marked set (0 to 2). These bits provide the identity of one of the eight possibilities. STPM 208 (0 to 3) and (4 to 7) flow directly over the decoded set value and an AND match is performed. That AND match is then coupled with the congruence class AND match from section 302 of RSVT 210. Those values AND together. If a hit occurs (data cache hit, or D$HIT), a validity indication for the cacheline to be accessed with the instruction is residing in the RSVT 210. The process then moves to section 306. Section 306 indicates whether there are no sector valids or one sector valid or all sector valids. With each instruction that attempts to access data, the system decodes and determines which sector of the four sectors is needed. That sector will AND match with the sector valids currently residing in RSVT 210. If there is a match, a signal is sent (shown coming from the bottom of section 306) of either "fetching and the sectors are not here" or "fetching and the sectors are here." In the former case, RSVT 210 finds that cache lines that are in transition and sector valids that are needed for the load are not present. Therefore, RSVT 210 "blocks" the data valids that would otherwise be sent out to the ISU 206. If it were not for RSVT 210, the data valid would be sent because there is a hit for at least one sector in the set mechanism. However, because the sector valid for the instruction is not present and the system is still fetching, the sector valid is turned off. This is known as a partial hit reject. The next step is to recycle the instruction when the ISU 206 receives an indication that the fetch of all sectors has completed. The instruction may not be in ISU 206, but could be located in a holding/reissue entity, and would be reissued from that entity instead of ISU 206. In many instances, this indication will come quickly if data is being fetched from L2 cache. Thus, the instruction can receive its data relatively quickly without any expensive flushing actions.

In the latter case (fetching and the sectors are here), the condition "fetching and the sectors are not here" is not activated, and a data valid is sent to ISU 206 with respect to this partial hit condition. In some embodiments, other conditions outside the scope of this disclosure may cause the data valid to not be sent.

In some embodiments, RSVT 210 can be implemented with about 150 latches. If a directory mechanism is used to track sector valid bits, upwards of 4000 latches may be needed. Thus, the use of RSVT 210 as described herein can save a large amount of space in the processing core.

Figure 4:
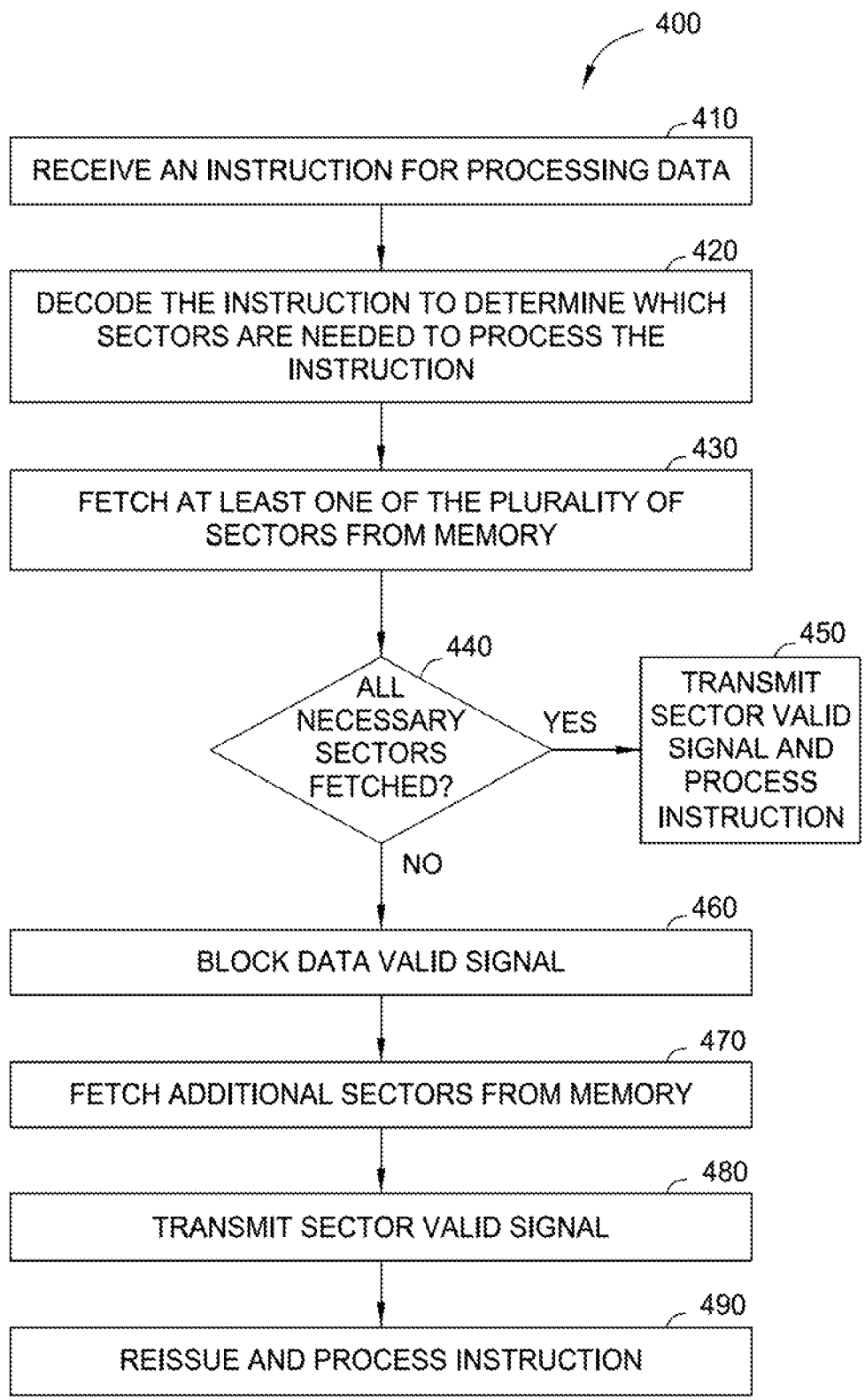
FIG. 4 is a flowchart illustrating an example method for fetching data from memory, according to one embodiment.

FIG. 4 is a flowchart illustrating an example method 400 for fetching data from memory, according to one embodiment. Although the method steps are described in conjunction with the systems of FIGS. 1-3, persons skilled in the art will understand that any system configured to perform the method steps, in any order, falls within the scope of the present invention. In various embodiments, the hardware and/or software elements described above in FIGS. 1-3 can be configured to perform the method steps of FIG. 4. As an example, processor chip 120 can perform the steps of FIG. 4.

The method begins at step 410, wherein an instruction is received for processing data. The data comprises a plurality of sectors. Receiving the instruction comprises an instruction fetch unit delivering instructions to ISU 206 in some embodiments.

The method proceeds to step 420, where the instruction is decoded to determine which of the plurality of sectors are needed to process the instruction. As described above, the data may need to be retrieved from memory in sectors due to the limitations of the bussing system that delivers the data from memory.

The method proceeds to step 430, where LFQ 204 fetches at least one of the plurality of sectors from memory. In some embodiments, more than one sector may be fetched at a time. Or, the sectors may be fetched one at a time. If the instruction requires fewer than all of the sectors to process the instruction, LFQ 204 fetches the sectors of the data that are needed. In this manner, instructions can be processed more quickly by not having to fetch an entire cacheline of data when only a subset of the sectors is needed.

The method proceeds to step 440, where the processing system determines whether each sector that is needed to process the instruction has been fetched. The sectors that have been fetched can be determined by interrogating a table of sector valid bits such as RSVT 210. As LFQ 204 fetches sectors from memory, sector valid bits for each fetched sector are stored in RSVT 210 (see section 306 in FIG. 3). RSVT 210 is updated as sectors are retrieved.

If all sectors needed to process the instruction have been fetched, the method proceeds to step 450. At step 450, a sector valid signal is transmitted to ISU 206 and the instruction can be further processed in the processing pipeline.

If all sectors needed to process the instruction have not been fetched, the method proceeds to step 460. At step 460, a data_valid signal is blocked from being transmitted to ISU 206. If a data_valid signal is sent before all sectors are fetched, the processing system may have to flush out the dependent operations that have consumed this errant data, which is disruptive to the flow of the program. By interrogating sector valid bits in RSVT 210 before sending a sector valid signal, this flush can be avoided.

The method proceeds to step 470, where additional sectors are fetched from memory by LFQ 204 until all sectors needed to process the instruction have been fetched. Sector valid bits are stored in RSVT 210 as sectors are fetched. Once all sectors for processing the instruction have been fetched, a sector valid signal is transmitted to ISU 206 in step 480. Once ISU 206 receives this indication that the sectors have been fetched, the instruction is reissued in step 490 and processed by the processing pipeline. In other embodiments, the instruction may not be in ISU 206 but in another entity, such as a holding/reissue entity.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the present disclosure may be devised without departing from the basic scope thereof, and the scope thereof is determined by the claims that follow.

What is claimed is:

1. A computer implemented method for fetching data from a memory, comprising:
    receiving an instruction for processing data, wherein the data comprises a plurality of sectors;
    decoding the instruction to determine one or more sectors of the plurality of sectors that are needed to process the instruction, wherein the one or more sectors that are needed to process the instruction comprise a subset of the plurality of sectors;
    fetching at least one of the plurality of sectors from memory;
    determining whether each sector that is needed to process the instruction has been fetched; and
    if all sectors needed to process the instruction have been fetched:
        transmitting a sector valid signal and processing the instruction;
    if all sectors needed to process the instruction have not been fetched:
        blocking a data valid signal from being transmitted to an instruction sequencing unit (ISU) to prevent errant data from being processed before fetching of the subset is completed;
        fetching an additional one or more of the plurality of sectors until all sectors needed to process the instruction have been fetched;
        transmitting a sector valid signal to the ISU indicating that the instruction is ready for further processing; and
        reissuing the instruction and processing the instruction using the fetched sectors.

2. The method of claim 1, wherein the sector valid signal is transmitted to an issue sequencing unit.

3. The method of claim 1, wherein fetching at least one of the plurality of sectors from memory comprises fetching a sector and storing an associated sector valid bit in a table.

4. The method of claim 3, wherein determining whether each sector that is needed to process the instruction has been fetched comprises reading sector valid bits in a table for each sector that is fetched.

5. The method of claim 1, wherein the data valid signal indicates that all sectors needed to process the instruction have been fetched.

6. The method of claim 1, wherein determining whether each sector that is needed to process the instruction has been fetched comprises interrogating a table of fetches that are in flux.

7. The method of claim 6, wherein the table of fetches comprises an entry for each fetch in flux, wherein each entry further comprises a cacheline congruence class, a set, and one or more sector valid bits.

8. A computer program product for fetching data from a memory, the computer program product comprising a non-transitory computer-readable storage medium having computer-readable program code embodied therewith, the computer-readable program code executable by a processor to cause the processor to:
    receive an instruction for processing data, wherein the data comprises a plurality of sectors;
    decode the instruction to determine which of the plurality of sectors are needed to process the instruction, wherein the sectors that are needed to process the instruction comprise a subset of the plurality of sectors;
    fetch at least one of the plurality of sectors from memory;
    determine whether each sector that is needed to process the instruction has been fetched; and
    if all sectors needed to process the instruction have been fetched:
        transmit a sector valid signal and processing the instruction;
    if all sectors needed to process the instruction have not been fetched:
        blocking a data valid signal from being transmitted to an instruction sequencing unit (ISU) to prevent errant data from being processed before fetching of the subset is completed;
        fetching an additional one or more of the plurality of sectors until all sectors needed to process the instruction have been fetched;
        transmitting a sector valid signal to the ISU indicating that the instruction is ready for further processing; and
    reissue the instruction and process the instruction using the fetched sectors.

9. The computer program product of claim 8, wherein the sector valid signal is transmitted to an issue sequencing unit.

10. The computer program product of claim 8, wherein fetching at least one of the plurality of sectors from memory comprises fetching a sector and storing an associated sector valid bit in a table.

11. The computer program product of claim 10, wherein determining whether each sector that is needed to process the instruction has been fetched comprises reading sector valid bits in a table for each sector that is fetched.

12. The computer program product of claim 8, wherein the data valid signal indicates that all sectors needed to process the instruction have been fetched.

13. The computer program product of claim 8, wherein determining whether each sector that is needed to process the instruction has been fetched comprises interrogating a table of fetches that are in flux.

14. The computer program product of claim 13, wherein the table of fetches comprises an entry for each fetch in flux, wherein each entry further comprises a cacheline congruence class, a set, and one or more sector valid bits.

15. A system, comprising:
    a processor; and
    a memory storing a program, which, when executed on the processor, performs an operation, the operation comprising:
    receiving an instruction for processing data, wherein the data comprises a plurality of sectors;
    decoding the instruction to determine which of the plurality of sectors are needed to process the instruction, wherein the sectors that are needed to process the instruction comprise a subset of the plurality of sectors;
    fetching at least one of the plurality of sectors from memory;
    determining whether each sector that is needed to process the instruction has been fetched; and
    if all sectors needed to process the instruction have been fetched:
        transmitting a sector valid signal and processing the instruction;
    if all sectors needed to process the instruction have not been fetched:
        blocking a data valid signal from being transmitted to an instruction sequencing unit (ISU) to prevent errant data from being processed before fetching of the subset is completed;
        fetching an additional one or more of the plurality of sectors until all sectors needed to process the instruction have been fetched;
        transmitting a sector valid signal to the ISU indicating that the instruction is ready for further processing; and
    reissuing the instruction and processing the instruction using the fetched sectors.

16. The system of claim 15, wherein the sector valid signal is transmitted to an issue sequencing unit.

17. The system of claim 15, wherein fetching at least one of the plurality of sectors from memory comprises fetching a sector and storing an associated sector valid bit in a table.

18. The system of claim 17, wherein determining whether each sector that is needed to process the instruction has been fetched comprises reading sector valid bits in a table for each sector that is fetched.

19. The system of claim 15, wherein determining whether each sector that is needed to process the instruction has been fetched comprises interrogating a table of fetches that are in flux.

20. The system of claim 19, wherein the table of fetches comprises an entry for each fetch in flux, wherein each entry further comprises a cacheline congruence class, a set, and one or more sector valid bits.

* * * * *